INVENTOR:
RAYNAL M. BAGWELL
BY Eaton, Bell, Hunt + Seltzer
ATTORNEYS

United States Patent Office 2,855,217
Patented Oct. 7, 1958

2,855,217

LOAD RETAINING DEVICE

Raynal M. Bagwell, Rock Hill, S. C.

Application July 3, 1956, Serial No. 595,637

4 Claims. (Cl. 280—179)

This invention relates to devices to prevent a load from shifting or bouncing off a wheeled vehicle while in movement. More particularly, the load retaining device is particularly constructed for preventing elongated objects such as boards, pipes or the like, extending beyond the rear end of a wheeled vehicle, from bouncing or pivoting out of the body of the vehicle while the same is in movement.

It is therefore a primary object of this invention to provide a pivotally mounted load retaining device which is normally horizontally disposed adjacent the front wall of the truck body when not in use for retaining a load, but is adapted to be vertically disposed when in use for engaging the inner end portion of long pipes, boards or the like to prevent the same from being displaced from the body of the vehicle.

It is another object of this invention to provide a load retaining device which when vertically disposed straddles the load in the vehicle which is positioned therebelow to prevent the same from moving upwardly and which is so designed that it can be used with a heavy load by permitting a portion of the load to be placed upon and above the retaining device.

It is a more specific object of the invention to provide a load retaining device particularly designed for a wheeled vehicle such as a pick-up truck wherein the device is U-shaped with its legs pivotally mounted to the side walls of the truck body, and when vertically disposed the upper portion of the legs terminate at substantially the midpoint of the depth of the truck body. Stop means in the form of lugs secured to the lower portions of the legs of the device or shoulder portions formed integral with the side walls of the truck body are provided for preventing the load retaining member from pivoting rearwardly substantially beyond the vertical position so as to readily permit the load retaining member to be employed as a securing bar or hitching post in the event that it is desired to carry calves or similar animals in the truck in lieu of a load of lumber or the like.

It is a further object of the invention to provide a load retaining device which is so positioned with respect to a truck body that the same, when not in use for hauling boards or the like, will lie closely adjacent the side and front walls and parallel thereto completely out of the way of any other type of load being carried.

Some of the objects of the invention having been stated, other objects will appear as the description proceeds, when taken in connection with the accompanying drawings, in which—

Figures 1, 2, 3, 4, 5:
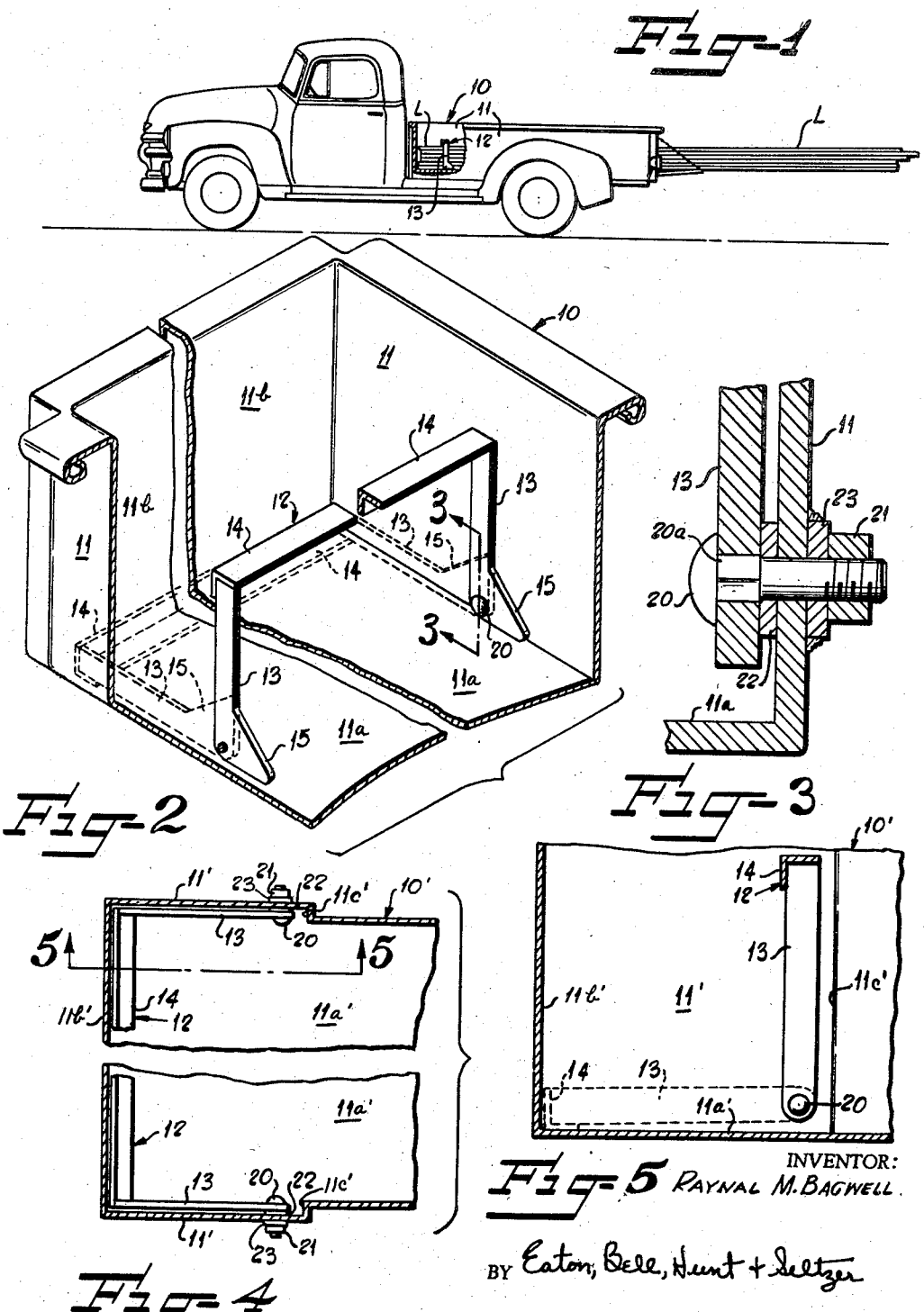
Figure 1 is a side elevation with parts broken away for purposes of clarity and showing the load retaining device employed in conjunction with a conventional pick-up truck.
Figure 2 is a fragmentary enlarged perspective view of the truck body of Figure 1 with parts broken away for purposes of clarity and showing in solid lines the position of the load retaining device when in use and in dotted lines in its inactive position.
Figure 3 is a fragmentary enlarged vertical section taken along line 3—3 of Figure 2 and showing the manner in which the load retaining device is pivotally connected to the side walls of the truck body.
Figure 4 is a top plan view with parts broken away of a modified form of the invention wherein the side walls of the truck body are provided with shoulders for preventing the load retaining member from pivoting rearwardly substantially beyond a vertical position.
Figure 5 is an enlarged vertical sectional view taken substantially along line 5—5 in Figure 4 and showing in dotted lines the normal operating position of the load retaining device and in dotted lines its inactive position.

Referring more specifically to the drawings, reference numeral 10 broadly indicates the truck body of a wheeled vehicle shown in the form of a pick-up truck. The truck body 10 has opposed side walls 11, a bed or bottom wall 11a and a front wall 11b. Pivotally secured to the side walls 11 adjacent the bed 11a is a load retaining device broadly indicated by reference numeral 12. The load retaining device 12 is substantially U-shaped and has a pair of opposed legs 13 connected together remote from their pivot point by a cross member 14 preferably formed from angle iron to add strength and to prevent the same from bowing upwardly after continued use.

Stop members or abutments 15 are connected to or formed integral with the lower rear portion of the legs 13 to serve to prevent the load retaining device 12 from pivoting rearwardly beyond the position shown in solid lines in Figure 2 as for example when it is desired to use the load retaining device as a securing bar or hitching post for tying calves or the like in the truck. Furthermore, the stop members 15 serve to hold the load retaining device in a vertical position to facilitate the loading of lumber L in the truck body 10.

The load retaining device 12 is pivotally mounted to the lower portions of the side walls 11 by a round headed bolt 20 having a hexagonally or irregularly shaped portion 20a which mates with a similar shaped portion or aperture formed in each of the legs 13. A nut 21 is provided for the bolt and seats against a side wall reinforcing plate 23. A small washer 22 is positioned between the side walls 11 and the legs 13 to provide a small clearance for the load retaining device to be readily pivoted from the horizontal position shown in Figure 2 in dotted lines to the operating position shown in solid lines. It is apparent that the irregularly shaped portion 20a permits the bolt 20 to be held stationary while the nut 21 is being tightened.

When the load retaining device 12 is vertically disposed as shown in Figures 1 and 2, it straddles the load of lumber L to prevent the same from pivoting or bouncing out of the truck body. Although Figure 1 shows the lumber stacked to a height that the same engages the cross member 14 to be securely positioned on the truck, the invention is not restricted to this arrangement. The retaining device will prevent even a single board or single layer of boards from pivoting or bouncing out of the truck. To accomplish this, the retaining device 12 is positioned so that the cross member 14 is at about the medial point of the depth of the truck body 10 when the retaining device is vertically disposed.

Furthermore, it should be noted that the retaining device permits lumber or the like to be stacked upon and above it. Therefore, the lumber L, shown in Figure 1 firmly secured by the retaining device 12 serves as a solid base in the event the truck body 10 is filled with lumber.

As is readily apparent upon an inspection of Figure 2, when the load retaining device 12 is horizontally disposed and not being used, it is positioned closely adjacent the side walls 11 and the front wall 11b to permit the full area of the truck body to be used.

Now referring to Figures 4 and 5, reference numeral 10' indicates a modified truck body having opposed side walls 11', a bed 11a' and a front wall 11b'. Shoulder portions 11c' formed integral with the side walls 11' serve to define a wider portion in the front portion of the truck body. The shoulder portions serve as stops for the load retaining member 12 in the same manner as the stops 15 in Figure 2.

If the load retaining device 12 were to always be used for retaining elongated members such as the planks of lumber L, pipes or the like, there would be no need for providing the stops 15 as shown in Figure 2 or providing shoulder portions 11c' as in Figure 4 to prevent the load retaining device from pivoting rearwardly substantially beyond its vertical position. However, for versatility of the load retaining device to permit the same to be used for retaining elongated members such as lumber, pipes or the like as well as to be used as a securing bar or hitching post for animals, it is preferable that the stops 15 or shoulders 11c' be provided. It is apparent that if animals were hitched to the cross member 14 of the load retaining device and the same were permitted to pivot rearwardly substantially beyond the vertical position, the animals might be displaced from the bed of the truck body.

Although the invention has been particularly described in association with a wheeled vehicle, such as a pick-up truck, it is apparent that the invention is not restricted thereto but may be equally employed in other types of wheeled vehicles, such as a wagon or a trailer for example. Furthermore, the invention can be used with a wheeled vehicle having only a flat bed and no sides in which event a pair of angle brackets, for example, would be secured to the upper or lower side of the bed to pivotally support the load retaining device.

In the drawings and specification there has been set forth several embodiments of the invention and, although specific terms are employed, they are used in a generic and descriptive sense only and not for purposes of limitation, the scope of the invention being defined in the claims.

I claim:

1. In a wheeled vehicle having a load supporting body having a bed and opposed side walls, the combination therewith of a load retaining device for preventing a load of lumber or the like extending beyond the rear end of the body from being displaced therefrom, said device comprising a substantially U-shaped member pivotally connected to opposite sides of the body adjacent the front portion thereof, said U-shaped member adapted to be moved from a forwardly extending horizontal position to a vertical position to straddle the lumber or the like positioned in the body and stop means for preventing the U-shaped member from pivoting rearwardly to a horizontal position.

2. In a wheeled vehicle having a load supporting body provided with a bed and opposed side walls, the combination therewith of a load retaining device for preventing a load of lumber or the like extending beyond the rear end of the body from being displaced therefrom, said device comprising a substantially U-shaped member pivotally connected to opposite sides of the body adjacent the front portion thereof, said U-shaped member adapted to be moved from forwardly extending horizontal position to a vertical position to straddle the lumber or the like positioned in the body and stop means for preventing the U-shaped member from pivoting rearwardly to a horizontal position, said stop means comprising shoulder portions formed integral with the side walls of the body to maintain the load retaining member in a substantially upright position when pivoted rearwardly.

3. A load retaining device for preventing a load of lumber or the like extending beyond the rear end of a truck body from being displaced therefrom, said device comprising a substantially U-shaped member pivotally connected to opposite sides of the truck body, said U-shaped member adapted to be moved from a forwardly extending horizontal position to a vertical position to straddle the lumber or the like positioned therebetween and stop means for preventing the U-shaped member from pivoting rearwardly to a horizontal position, said stop means comprising shoulder portions formed integral with the side walls of the truck body to maintain the load retaining member in a substantially upright position.

4. A load retaining device for preventing a load of lumber or the like extending beyond the rear end of a truck body from being displaced therefrom, said device comprising a pair of legs connected together by a cross member at one end thereof to form a substantially U-shaped member, said U-shaped member adapted to be pivotally connected to opposite sides of the truck body at the ends of the legs remote from the cross member, said U-shaped member being adapted to be moved from a forwardly extending horizontal position to a vertical position to straddle the lumber or the like positioned therebetween, and a stop member connected to each leg adjacent its pivot point and extending outwardly therefrom to form an abutment surface, whereby said stop members are adapted to engage the truck body along said abutment surfaces when the U-shaped member is moved to a vertical position to prevent the U-shaped member from pivoting rearwardly to a horizontal position.

References Cited in the file of this patent

UNITED STATES PATENTS

| | | |
|---|---|---|
| 1,365,368 | Bliss | Jan. 11, 1921 |
| 2,349,109 | O'Keeffe | May 16, 1944 |
| 2,500,259 | Melvin | Mar. 14, 1950 |

FOREIGN PATENTS

| | | |
|---|---|---|
| 578,688 | Great Britain | July 8, 1946 |